United States Patent [19]
Ichino et al.

[11] Patent Number: 5,858,264
[45] Date of Patent: Jan. 12, 1999

[54] COMPOSITE POLYMER ELECTROLYTE MEMBRANE

[75] Inventors: Toshihiro Ichino, Hoya; Yukitoshi Takeshita, Tokyo-To; Fumio Yamamoto, Katsuta; Hiroshi Kato, Okayam; Naofumi Mushiake; Takayuki Wani, both of Okayama, all of Japan

[73] Assignees: Japan Gore-Tex, Inc.; Nippon Telegraph and Telephone Corporation, both of Japan

[21] Appl. No.: 824,864

[22] Filed: Mar. 26, 1997

[30] Foreign Application Priority Data

Mar. 26, 1996 [JP] Japan .................... 8-094653

[51] Int. Cl.⁶ .................... H01M 10/40; H01M 6/18
[52] U.S. Cl. .................... 252/62.2; 429/190; 429/192; 204/252
[58] Field of Search .................... 429/192, 190; 252/62.2; 204/252

[56] References Cited

U.S. PATENT DOCUMENTS

| | | | |
|---|---|---|---|
| 4,865,930 | 9/1989 | Kinkler et al. | 429/192 |
| 5,219,679 | 6/1993 | Abraham et al. | 429/192 |
| 5,252,413 | 10/1993 | Alamgir et al. | 429/192 |
| 5,334,330 | 8/1994 | Rowlette | 252/512 |
| 5,409,588 | 4/1995 | Mushiake et al. | 204/252 |
| 5,521,023 | 5/1996 | Kejha et al. | 429/142 |
| 5,589,295 | 12/1996 | Derzon et al. | 429/190 |
| 5,597,659 | 1/1997 | Morigaki et al. | 429/190 |
| 5,639,573 | 6/1997 | Oliver et al. | 429/190 |
| 5,658,685 | 8/1997 | Oliver | 429/190 |

FOREIGN PATENT DOCUMENTS

| | | |
|---|---|---|
| 0 226 911 | 7/1987 | European Pat. Off. . |
| 0 651 455 | 5/1995 | European Pat. Off. . |
| 0 661 336 | 7/1995 | European Pat. Off. . |
| 0 718 903 | 6/1996 | European Pat. Off. . |
| 718903 | 6/1996 | European Pat. Off. . |

OTHER PUBLICATIONS

Abraham et al., "Polymer Electrolytes Reinforced by Celgard Membranes", J. Electrochem. Soc., vol. 142, No. 3, pp. 683–687, Mar. 1995.

MacFarlane et al. "Structure–Property Relationships in Plasticized Solid Polymer Electrolytes", Electrochimica Acta, vol. 40., No. 13, pp. 2131–2136, Mar. 1995.

*Primary Examiner*—Alan Diamond
*Attorney, Agent, or Firm*—Allan M. Wheatcraft

[57] ABSTRACT

A composite polymer electrolyte membrane which includes an ion-conductive polymer gel contained and supported by a matrix material formed of a porous polytetrafluoroethylene membrane. The porous polytetrafluoroethylene membrane has an internal structure which defines a three-dimensional network of interconnected passages and pathways throughout the membrane. The composite polymer electrolyte membrane has a tensile break strength of at least 10 MPa in at least two orthogonal planar directions, ion conductivity of at least 1 mS/cm, and is useful as a separator between electrodes of a lithium secondary cell.

15 Claims, No Drawings

COMPOSITE POLYMER ELECTROLYTE MEMBRANE

FIELD OF THE INVENTION

The invention relates to an electrolyte-containing diaphragm for a secondary electrochemical cell, more particularly to a polymer-electrolyte-containing diaphragm for use in an electrochemical cell having an electrode of an alkaline metal or alkaline metal alloy.

BACKGROUND OF THE INVENTION

Recent advances in portable electronic devices have been accompanied by increased interest in the electrochemical cells that supply power to these devices. Of particular interest are secondary energy cells, i.e., batteries or cells in which electrical energy can be repeatedly drained and recharged. Lithium-metal and lithium-ion secondary cells have very high electrical energy storage capacity, or energy density, and are the subject of vigorous development efforts. Typically, lithium secondary cells include a porous dielectric separator, or diaphragm, interposed between the electrodes of the cell and a liquid electrolyte to provide ionic conductivity. For convenience, "lithium secondary cells" or "lithium cells", will be used herein to include both lithium-metal and lithium-ion type batteries and secondary cells.

Also known are lithium secondary cells in which the electrolyte is a solid polymer electrolyte or a polymeric gel electrolyte. An example of a solid polymer electrolyte is a complex type electrolyte in which a metal salt, such as a lithium salt, and a polymer complex, such as a polyethylene oxide complex, each providing ligands, or complexing agents, are combined together. Ion transport is effected by movement of salt ions between ligands of the polymer complex, and is limited by the mobility of the side chains having ligands of the polymer complex. Such a solid polymer electrolyte has good mechanical strength, however, at room temperature, side chain mobility is quite low and ionic conductivity is limited to about 0.1 mS/cm.

In contrast to the solid polymer electrolyte described above is a polymeric gel electrolyte in which a liquid solvent/metal salt system is combined with a polymeric component to provide solid-like material properties. With this type of electrolyte ionic conductivity as high as about 1 mS/cm can be achieved by increasing the ion-conductive component, however, there is a concomitant decrease in tensile strength of the material. In such materials, when the ionic conductivity is high the tensile strength is only about 0.5 MPa, even when the polymeric component is crosslinked (see, for example, D. R. McFarlane, et al., Electrochimica Acta, Vol. 40, p.2131 [1995]). Accordingly, such materials require mechanical support in order to be useful as a separator or diaphragm in a battery or electrochemical cell.

Porous membranes of polyolefins, such as polyethylene and polypropylene, impregnated with polymer gel electrolyte are known for use as separators in lithium secondary cells. For example, a lithium secondary battery having a separator comprising a microporous polyethylene membrane impregnated with a polymer gel electrolyte is disclosed in U.S. Pat. No. 5,597,659 (to Morigaki, et al.). In another example, a solution consisting of ethylene carbonate, propylene carbonate, tetraethylene glycol dimethyl ether (tetraglyme), LiAsF6, tetraethylene glycol diacrylate, and a small amount of a photopolymerization initiator is impregnated into porous polyethylene and polypropylene membranes and polymerized to form a solid electrolyte (K. M. Abraham, et al., Journal of the Electrochemical Society, Vol. 142, p. 683 (1995). Such membrane-supported solid polymer electrolytes and polymer gel electrolytes for separators in lithium cells represent a significant improvement in the state of the art, however, the gains in strength were made at the expense of ion conductivity, which was reduced by more than one order of magnitude compared to the polymer electrolytes when unsupported.

Properties which must be considered for selection of a support material for a solid polymer electrolyte or polymer gel electrolyte for use as a separator between electrodes in an electrochemical cell, in particular for a high energy cell such as a lithium secondary cell, include: chemical compatibility with the electrode materials and electrolytes; strength, sufficient to withstand the rigors of manufacturing and use; thickness, thin materials being desirable to minimize ion transport distance and maximize transport rate; and porosity, a combination of pore size, pore volume, and structure, which should be optimized to provide for introduction and retention of the electrolyte and to maximize ion conductivity between the electrodes. However, because many of these properties interact in opposition to each other, optimization of each property may be mutually excluded and compromises must be accepted. For example, it is desirable that a support material have a high pore volume and high strength, however, other characteristics being kept equal, as porosity increases strength decreases, which may lead to a tradeoff between strength required and pore volume desired.

Polyethylene and polypropylene have been used as separators, or as separators supporting solid polymer electrolytes and polymer gel electrolytes, between electrodes in lithium secondary cells due to their chemical compatibility with the electrode materials and electrolytes used in the cells. However, in such materials, porous membranes having the combination of strength, thickness, and porosity characteristics desired for greatest effectiveness are unavailable. When suitable thinness and porosity is obtainable, for example, about 1 micrometer thick and pore volume greater than 70 percent, the pore size available is so small as to make it difficult to impregnate the membrane with the electrolyte; and furthermore, the tensile strength may be quite low generally, or may be anisotropic, having a higher tensile strength in one planar direction than the tensile strength in the orthogonal planar direction which is relatively much lower. Low general tensile strength, or anisotropic tensile strength, can lead to handling and manufacturing difficulties, or may lower puncture and tear resistance of the porous membrane.

It is seen, then, that the effectiveness of membrane-supported solid polymer electrolytes and polymer gel electrolytes in lithium secondary cells can be highly influenced by the nature of the membrane support. It is the purpose of this invention to provide a membrane-supported polymer electrolyte separator for an electrochemical secondary cell which combines high strength, at least 10 MPa in at least two orthogonal directions, and high ion conductivity of at least 1 mS/cm, which heretofore has been unavailable.

SUMMARY OF THE INVENTION

Broadly described, the invention is a composite polymer electrolyte membrane comprising an ion-conductive polymer gel contained and supported by a matrix material formed of a porous polytetrafluoroethylene membrane having a tensile break strength of at least 10 MPa in at least two orthogonal planar directions. The porous polytetrafluoroethylene membrane has an internal structure which defines a three-dimensional network of interconnected passages and pathways which extend vertically, from surface to surface, and laterally, from edge to edge, throughout the membrane.

At least one planar surface of the porous polytetrafluoroethylene membrane is coated with an ion-conductive polymer gel, an amount of which is impregnated into the membrane in a quantity at least sufficient to provide a continuous ion-conductive path from one surface to the other. The ion conductive gel comprises an organic polymer component and an ion-conductive component.

DETAILED DESCRIPTION OF THE INVENTION

Polytetrafluoroethylene is noted for its remarkable chemical resistance to mineral acids, bases and common organic solvents, however, its use in lithium secondary cells is militated against due to its known tendency to be chemically attacked by alkali metals, fluorine, and strong fluorinating agents at elevated temperature and pressure. However, the inventors have discovered that biaxially stretched porous membranes of polytetrafluoroethylene can be used as support membranes for separator diaphragms in lithium cells; whereby their excellent combination of physical properties which include high biaxial or multiaxial strength, favorable porosity characteristics, and availability in thin cross-sections, can be used to great advantage as a porous matrix material for containing and retaining a solid polymer electrolyte or polymer gel electrolyte in a composite polymer electrolyte membrane. Such porous polytetrafluoroethylene membranes can be manufactured by methods known in the art, and are available commercially. Preferably the porous polytetrafluoroethylene film is porous expanded polytetrafluoroethylene film having a structure of interconnected nodes and fibrils, as described in U.S. Pat. Nos. 3,953,566 and 4,187,390 which describe the preferred material and processes for making them. The nodes and fibrils define an internal structure having a three-dimensional network of interconnected passages and pathways which extend vertically, from surface to surface, and laterally, from edge to edge, throughout the membrane.

The thickness of the porous expanded polytetrafluoroethylene membrane should be in the range 10 to 400 micrometers. If thicker than about 400micrometers it becomes difficult to impregnate the porous membrane with sufficient polymer electrolyte to provide continuous ion conductive paths through the membrane to ensure ion conductivity of 1 mS/cm and, furthermore, occupies too much space within the cell. Preferably, the membrane should be in the range 10 to 40 micrometers thick.

From the standpoint of ion conductivity, the pore volume of the porous expanded polytetrafluoroethylene membrane should be at least 40 percent, but from the standpoint of strength it should be no more than 95 percent. Preferably, the pore volume is in the range about 50 to 92 percent, more preferably in the range about 75 to 92 percent. The maximum pore size of the porous membrane should be in the range 0.05 to 10 micrometers, preferably in the range 0.2 to 2 micrometers. If the maximum pore size is less than 0.05 micrometers it is difficult to impregnate a solution containing electrolyte materials or electrolyte material precursors into the membrane. If the maximum pore size is greater than 10 micrometers it becomes difficult for the membrane to retain the electrolyte materials or electrolyte material precursors. Also, lower mechanical strength is another drawback to a pore size that is too large.

Composite polymer electrolyte membranes comprising a matrix material of such biaxially stretched porous expanded polytetrafluoroethylene membranes described above should have a tensile break strength of at least 10 MPa in at least two orthogonal directions. Additionally, the structure of interconnected passages defined by the nodes and fibrils can be readily impregnated with the ion-conductive polymer gel and provides excellent retention characteristics through assembly and use.

The ion-conductive polymer gel comprises an organic polymer component and an ion-conductive component.

There are no particular limitations on the ion-conductive component, which will vary according to the intended application. For instance, in a lithium secondary cell a metal salt such as $LiClO_4$, $LiBF_4$, $LiPF_6$, LiSCN, $Li(CF_3SO_3)$, $LiAsF_6$, or other lithium salt can be used, alone or as a mixture. The lithium salts can be dissolved and applied to the porous matrix material of expanded polytetrafluoroethylene in solution form. Suitable solvents include, but are not limited to, ethylene carbonate, polypropylene carbonate, γ-butyrolactone, γ-valerolactone, γ-valerolactone, γ-octanic lactone, dimethyl carbonate, dimethyl sulfoxide, acetonitrile, sulfolane, dimethylformamide, dimethylacetamide, 1,2-diethoxyethane, 1,2-dimethoxyethane, 1,2-ethoxymethoxyethane, 1,2-dibutoxyethane, diethyl carbonate, methyl ethyl carbonate, tetrahydrofuran, 2-methyl tetrahydrofuran, dioxolane, methyl acetate, and other aprotic solvents or solvent mixtures. The concentration of the ion-conductive component should be 0.01 to 5 mol per kg of solution.

The organic polymer component of the ion-conductive polymer gel is preferably one that contains polar units which have an affinity for, and can coordinate with, the highly polar units of the ion-conductive component. Examples are polymers derived from monomers having a structural formula $H_2C=CHCOOR$ and $H_2C=CHOCOR$, wherein R is a hydrogen or an alkyl group having 1–6 carbons, such as ethyl acrylate, methyl acrylate, vinyl acetate, and the like; or polymers derived from monomers such as alkylene oxides, acrylonitrile, methacrylonitrile, vinylidene fluoride, vinyl chloride, methacrylic acid (and metal salts), acrylic acid (and metal salts), vinyl alcohol, vinylidene chloride, ethyleneimide, vinyl acetate, vinyl pyrrolidone, and cellulose. Especially favorable is a monomer having a structural formula shown above which contains ester groups that have an affinity for and are shared with low molecular weight ester compounds in the organic solvents of the solution containing the ion-conductive component. Also, in order to form a polymeric gel with the ion-conductive component, the organic polymer component should have a crosslinked structure of covalent bonds or ionic bonds. A preferred organic polymer is a copolymer of acrylonitrile and butadiene (NBR) because a crosslinked structure can be easily formed by heating or other treatment. It is also possible to adjust the polarity of the NBR by varying the amount of acrylonitrile, which is the high polarity unit of the polymer, to enhance the affinity and coordination with polar units in the ion-conductive component. This so-called "physical crosslinking", in which organic groups with good affinity cohere together and crystallize in the polymer chain. is also a suitable crosslinked structure.

The ion-conductive component and organic polymer component are combined to form an ion-conductive polymer gel. In order for the conductivity of the polymer gel to be at least 1 mS/cm, the concentration of the solution containing the ion-conductive component should be not lower than 50 weight percent of the gel, preferably at least 60 wt. percent.

Conventional methods can be used to introduce the polymer gel electrolyte into the porous polytetrafluoroethylene membrane. For instance, the polymer gel electrolyte can be formed by first impregnating the organic polymer component into the porous membrane, and then immersing the impregnated membrane in a solution containing the ion-conductive component. In this method the first step is to prepare a solution or dispersion in which the polymer component or polymer precursor (such as a reactive oligomer) is dissolved or dispersed. The porous polytetrafluoroethylene membrane is then impregnated, preferably while under vacuum to remove air from the pores, with the polymer-containing solution, for example, by immersion. The solvent or dispersing medium is then removed from the impregnated film, for example, by heating or vacuum treatment, to dry the membrane. The dried polymer-impregnated membrane is then impregnated with the solution containing the ion-conductive component, for example, by immersion in the solution, which causes the polymer to swell and form an ion-conductive polymer gel. Alternatively, a solution or dispersion containing both the ion-conductive component and polymer component or precursor can be prepared, and both components introduced into the membrane simultaneously.

When a polymer precursor is used, it can be polymerized or crosslinked to convert it to a polymer at any convenient stage of the manufacturing process. It is preferable that the polymeric component be polymerized or crosslinked so as to form covalent or ionic bonds. Creation of a crosslinked structure suppresses the fluidity of the solution containing the ion-conductive component so that a semi-solid gel having high ion-conductivity is achieved. Ordinary polymerization or crosslinking procedures known in the art are used, and will depend on the functional groups present. The reactions may be initiated by heat or radiation energy, such as by light radiation, UV radiation, and the like. Crosslinking agents, reaction initiators, or reaction accelerators can also be added to effect polymerization or crosslinking.

It is important that any materials, such as water, alcohols, protic solvents, and the like, which can react with other elements present in the lithium cell, or other high energy cell, be removed from the composite polymer electrolyte membrane prior to assembly. Such materials can be easily eliminated by heating, vacuum drying, extraction, or other conventional methods.

TEST METHODS

Bubble Point Test—Maximum Pore Size

The Bubble Point was measured according to the procedures of ASTM F316-86. Isopropyl Alcohol was used as the wetting fluid to fill the pores of the test specimen.

The Bubble Point is the pressure of air required to displace the isopropyl alcohol from the largest pores of the test specimen and create the first continuous stream of bubbles detectable by their rise through a layer of Isopropyl Alcohol covering the porous media. This measurement provides an estimation of maximum pore size.

Ion-Conductivity Measurement

A membrane sample was sandwiched between stainless steel electrode discs (1 cm diameter). Resistance measurements were made using an impedance/gain-phase analyzer (Model 1260 Electrochemical Interface SI 1287, made by Solarton Instruments Co.). A Cole—Cole plot was obtained from the measurement data. The dc-resistance was taken as the point of intersection of the Cole—Cole plot with the horizontal axis. Ion-conductivity was determined from the dc-resistance and the shape factor according to the equation Ion Conductivity $(S/cm) = 1/R \times t/s$ where
R=resistance (ohms)
t=membrane thickness (cm)
s=electrode area (cm$^2$)

EXAMPLE 1

A solution containing an ion-conductive component was prepared by dissolving 1 mol of LiPF$_6$ (anhydrous) in a mixture having equal volumes of ethylene carbonate (anhydrous) and propylene carbonate (anhydrous). To 100 g of this solution was added 10 g of a copolymer of acrylonitrile and methyl acrylate (molar ratio—80:20; weight average MW—200,000), which was completely dissolved at 120° C. in an argon atmosphere. A reflux condenser was attached to the heated vessel to prevent the solvent from escaping.

With the temperature held at 120° C., a porous membrane of expanded polytetrafluoroethylene (thickness: 25 μm; pore volume: 80%; maximum pore size: 0.5 μm; made by Japan Gore-Tex, Inc.) was immersed in the solution and the vessel placed under vacuum to effect impregnation of the solution into the membrane. The vessel was opened, and the membrane was removed into an argon atmosphere, slowly cooled to 20° C., during which time the impregnated material "physically crosslinked" and gelled to form the composite polymer electrolyte membrane of the invention.

The tensile breaking strength (measured according to JIS Method JIS K 7113) was at least 12 MPa in all planar directions of the composite polymer electrolyte membrane. The ion conductivity of the polymer electrolyte membrane was measured as described hereinabove and found to be 1.2 mS/cm. After allowing the polymer electrolyte membrane to stand for 1 month, the ion conductivity and tensile strength were measured again. The ion conductivity was 1 mS/cm or higher, and there was no change in the tensile breaking strength.

EXAMPLE 2

In 450 g of methyl ethyl ketone were dissolved 50 g of anhydrous NBR (acrylonitrile/butadiene weight ratio of 55/45; weight average MW—250,000) and 0.2 g benzoyl peroxide. A porous membrane of expanded polytetrafluoroethylene (thickness: 25 μm; pore volume: 80%; maximum pore size: 0.5 μm; made by Japan Gore-Tex, Inc.) was immersed in the solution and the vessel placed under vacuum to effect impregnation of the solution into the membrane. The impregnated membrane was removed and dried for 6 hours at 50° C. in a dry nitrogen atmosphere. The temperature was raised to 180° C. and held for two hours to crosslink the NBR polymer contained by the membrane.

Separately, 1 mol of LiPF$_6$ (anhydrous) was dissolved in 1 kg of propylene carbonate (anhydrous) to produce an ion-conductive solution. The NBR-impregnated membrane was immersed for 12 hours in the ion-conductive solution to form a composite polymer electrolyte membrane of the invention.

The tensile breaking strength (measured according to JIS Method JIS K 7113) was at least 12 MPa in all planar directions of the composite polymer electrolyte membrane. The ion conductivity of the polymer electrolyte membrane was measured as described hereinabove and found to be 1.1 mS/cm. After allowing the polymer electrolyte membrane to stand for 1 month, the ion conductivity and tensile strength were measured again. The ion conductivity was 1 mS/cm or higher, and there was no change in the tensile breaking strength.

EXAMPLE 3

The example was prepared as described in Example 1 except that 10 g of a copolymer of acrylonitrile and vinyl acetate (molar ratio—85:15; weight average MW—200,000) was used instead of the copolymer of acrylonitrile and methyl acetate.

The tensile breaking strength (measured according to JIS Method JIS K 7113) was at least 12 MPa in all planar directions of the composite polymer electrolyte membrane. The ion conductivity of the polymer electrolyte membrane was measured as described hereinabove and found to be 1.1 mS/cm. After allowing the polymer electrolyte membrane to stand for 1 month, the ion conductivity and tensile strength were measured again. The ion conductivity was 1 mS/cm or higher, and there was no change in the tensile breaking strength.

Comparative Example 1

A solution containing the polymeric components of Example 1, a copolymer of acrylonitrile and methyl acrylate, was prepared. Instead of impregnating the solution into a porous polytetrafluoroethylene membrane, the solution was cast onto a substrate, cooled to −20° C. and solidified to form a film. An attempt to measure the tensile strength of the cast film was made, however, it did not have enough strength (at least 0.1 MPa) for measurement.

Comparative Example 2

A solution containing the components of the polymer electrolyte was prepared as described in Example 1. With the temperature held at 120° C., a porous polypropylene film (thickness: 25 $\mu$m; pore volume: <48%; maximum pore size: <0.2 $\mu$m; Celgard® 2500, made by Hoechst Celanese, Inc.) was immersed in the solution and the vessel placed under vacuum to effect impregnation of the solution into the membrane. Upon removal of the porous polypropylene film it was determined that the high viscosity of the solution prevented impregnation.

Comparative Example 3

A solution containing anhydrous NBR was prepared as described in Example 2. Instead of impregnating the solution into a porous polytetrafluoroethylene film, the solution was cast onto a substrate, under vacuum, to form a film, after which it was crosslinked as described in Example 2. The solution containing an ion-conductive component described in Example 2 was added to the crosslinked NBR polymer film to form a polymer electrolyte film. An attempt to measure the tensile strength of the polymer electrolyte film was made, however, it did not have enough strength (at least 0.1 MPa) for measurement.

EXAMPLE 4

A solution containing the polymeric components of Example 3, a copolymer of acrylonitrile and vinyl acetate, was prepared. Instead of impregnating the solution into a porous polytetrafluoroethylene membrane, the solution was cast onto a substrate, cooled to −20° C. and solidified to form a film. An attempt to measure the tensile strength of the cast film was made, however, it did not have enough strength (at least 0.1 MPa) for measurement.

We claim:

1. A composite polymer electrolyte membrane comprising:

a matrix material formed of a porous polytetrafluoroethylene membrane having opposite-facing planar surfaces and, between said surfaces, having an internal structure defining a three-dimensional network of interconnected passages and pathways;

said matrix material containing, throughout said passages and pathways, an amount of an ion-conductive non-solid polymer gel, whereby a continuous ion-conductive path from one said surface to at least said opposed surface is provided;

wherein the ion-conductive gel comprises an organic polymer component and an ion-conductive component, and wherein said composite membrane has a tensile break strength in at least two orthogonal directions of 10 MPa or greater.

2. The composite polymer electrolyte membrane as recited in claim 1 wherein said matrix material is a porous membrane of expanded polytetrafluoroethylene.

3. The composite polymer electrolyte membrane as recited in claim 2 wherein said organic polymer component includes at least one polymer derived from a monomer having a structural formula selected from the group consisting of $H_2C\!=\!CHCOOR$ and $H_2C\!=\!CHOCOR$, wherein R is a hydrogen or an alkyl group having 1–6 carbons.

4. The composite polymer electrolyte membrane as recited in claim 2 wherein said organic polymer component includes at least one polymer derived from a monomer selected from the group consisting of alkylene oxides, acrylonitrile, methacrylonitrile, vinylidene fluoride, vinyl chloride, methacrylic acid, acrylic acid, vinyl alcohol, vinylidene chloride, ethyleneimide, vinyl acetate, vinyl pyrrolidone, and cellulose.

5. The composite polymer electrolyte membrane as recited in claim 1 wherein said organic polymer component includes a copolymer of acrylonitrile and butadiene.

6. The composite polymer electrolyte membrane as recited in claim 2 wherein said organic polymer component includes a copolymer of acrylonitrile and butadiene.

7. The composite polymer electrolyte membrane as recited in claim 3 wherein the weight amount of said ion-conductive component is equal to or greater than the weight amount of said organic polymer component.

8. The composite polymer electrolyte membrane as recited in claim 4 wherein the weight amount of said ion-conductive component is equal to or greater than the weight amount of said organic polymer component.

9. The composite polymer electrolyte membrane as recited in claim 5 wherein the weight amount of said ion-conductive component is equal to or greater than the weight amount of said organic polymer component.

10. The composite polymer electrolyte membrane as recited in claim 6 wherein the weight amount of said ion-conductive component is equal to or greater than the weight amount of said organic polymer component.

11. The composite polymer electrolyte membrane as recited in claim 7 wherein said membrane has ionic conductivity of 1 mS/cm or greater and tensile break strength in all planar directions of 10 MPa or greater.

12. The composite polymer electrolyte membrane as recited in claim 8 wherein said membrane has ionic conductivity of 1 mS/cm or greater and tensile break strength in all planar directions of 10 MPa or greater.

13. The composite polymer electrolyte membrane as recited in claim 9 wherein said membrane has ionic conductivity of 1 mS/cm or greater and tensile break strength in all planar directions of 10 MPa or greater.

14. The composite polymer electrolyte membrane as recited in claim 10 wherein said membrane has ionic conductivity of 1 mS/cm or greater and tensile break strength in all planar directions of 10 MPa or greater.

15. The composite polymer electrolyte membrane as recited in claim 5, wherein said ion-conductive component comprises a lithium salt.

* * * * *